United States Patent [19]

Goffnett et al.

[11] Patent Number: 5,108,512
[45] Date of Patent: Apr. 28, 1992

[54] CLEANING OF CVD REACTOR USED IN THE PRODUCTION OF POLYCRYSTALLINE SILICON BY IMPACTING WITH CARBON DIOXIDE PELLETS

[75] Inventors: David M. Goffnett, Alma; Mark D. Richardson, Hemlock; Eugene F. Bielby, Saginaw, all of Mich.

[73] Assignee: Hemlock Semiconductor Corporation, Hemlock, Mich.

[21] Appl. No.: 760,300

[22] Filed: Sep. 16, 1991

[51] Int. Cl.⁵ .............................................. B08B 7/00
[52] U.S. Cl. ........................................ 134/7; 134/8; 51/320; 51/321
[58] Field of Search ................. 134/6, 7, 8, 22.18, 134/32; 51/317, 319, 320, 321

[56] References Cited

U.S. PATENT DOCUMENTS

| | | | |
|---|---|---|---|
| 3,702,519 | 11/1972 | Rice et al. | 51/320 |
| 4,000,335 | 12/1976 | Stahl | 427/74 |
| 4,173,944 | 11/1979 | Köppl et al. | 118/719 |
| 4,389,820 | 6/1983 | Fong et al. | 51/410 |
| 4,631,250 | 12/1986 | Hayashi | 134/7 |
| 4,657,616 | 4/1987 | Benzing et al. | 134/1 |
| 4,806,171 | 2/1989 | Whitlock et al. | 51/320 |
| 4,960,488 | 10/1990 | Law et al. | 131/1 |
| 5,035,750 | 6/1991 | Tada et al. | 134/7 |

Primary Examiner—Theodore Morris
Assistant Examiner—Saeed T. Chaudhry
Attorney, Agent, or Firm—William F. Boley

[57] ABSTRACT

The present invention is a process for the cleaning of the inner surfaces of a chemical vapor deposition reactor used in the production of polycrystalline silicon. The process comprises impacting the surfaces to be cleaned with solid carbon dioxide pellets. The carbon dioxide pellets dislodge silicon deposits from the surface of the reactor without damaging the surface of the reactor and without providing a source for contamination of polycrystalline silicon produced in the cleaned reactor. The present process is particularly useful for the cleaning of the inner surfaces of chemical vapor deposition reactors used in the production of semi-conductor grade silicon.

10 Claims, 1 Drawing Sheet

CLEANING OF CVD REACTOR USED IN THE PRODUCTION OF POLYCRYSTALLINE SILICON BY IMPACTING WITH CARBON DIOXIDE PELLETS

BACKGROUND OF INVENTION

The present invention is a process for the cleaning of the inner surfaces of a chemical vapor deposition reactor used in the production of polycrystalline silicon. The process comprises impacting the surfaces to be cleaned with solid carbon dioxide pellets. The carbon dioxide pellets dislodge silicon deposits from the surface of the reactor without damaging the surface of the reactor and without providing a source for contamination of polycrystalline silicon produced in the cleaned reactor. The present process is particularly useful for the cleaning of the inner surfaces of chemical vapor deposition reactors used in the production of semi-conductor grade silicon.

As the density of circuits formed on semi-conductor silicon chips continues to increase, there is an ever increasing need to provide semi-conductor grade silicon of greater purity. In general, it is necessary to provide semi-conductor grade silicon that has impurities such as phosphorous, boron, and carbon reduced to the parts per billion range. Typically, as a first step to producing this ultra-high purity semi-conductor grade silicon, a silane ($SiH_4$) or a halosilane such as trichlorosilane is decomposed onto a heated silicon element within a chemical vapor deposition (CVD) reactor. The polycrystalline silicon formed by this process is subsequently converted to monocrystalline silicon by standard techniques.

During the CVD process, amorphous silicon dust may be formed in the reactor by a process commonly referred to as homogeneous nucleation. In addition, deposition of silicon on the internal surfaces of the reactor can occur. Silicon deposits on the internal surfaces of the reactor act as an insulator causing the reactor bulk gas temperature to increase. A consequence of this reactor bulk gas temperature increase is that homogeneous nucleation, creating silicon dust, increases. This silicon dust typically contains high levels of contaminates and can settle on the product polycrystalline silicon causing unacceptable surface defects and contamination.

To prevent these problems with the silicon dust, it is often necessary to reduce the power to the forming silicon elements. While reducing power to the reactor is effective in reducing the temperature within the reactor, the reduction in power also reduces the rate of silicon deposition and the overall yield of the process per unit time. In addition, if silicon build up on the surfaces of the CVD reactor becomes too great, particles of silicon my dislodge and fall onto the forming polycrystalline silicon elements causing contamination and unacceptable surface imperfections.

Therefore, it is an objective of the present invention to provide a process for removing buildups on the inside surfaces of a CVD reactor used in the production of semi-conductor grade polycrystalline silicon. It is a further objective of the present invention to provide a process for cleaning the inner surfaces of the CVD reactor that does not pit, mar, or scour the surface being cleaned, since this could expose impurities in the reactor materials of construction and negatively impact the quality of product silicon. Finally, it is an objective of the present invention to provide a cleaning process that does not impart contamination to the CVD reactor that could subsequently contaminate product silicon.

SUMMARY OF INVENTION

Figure 1:
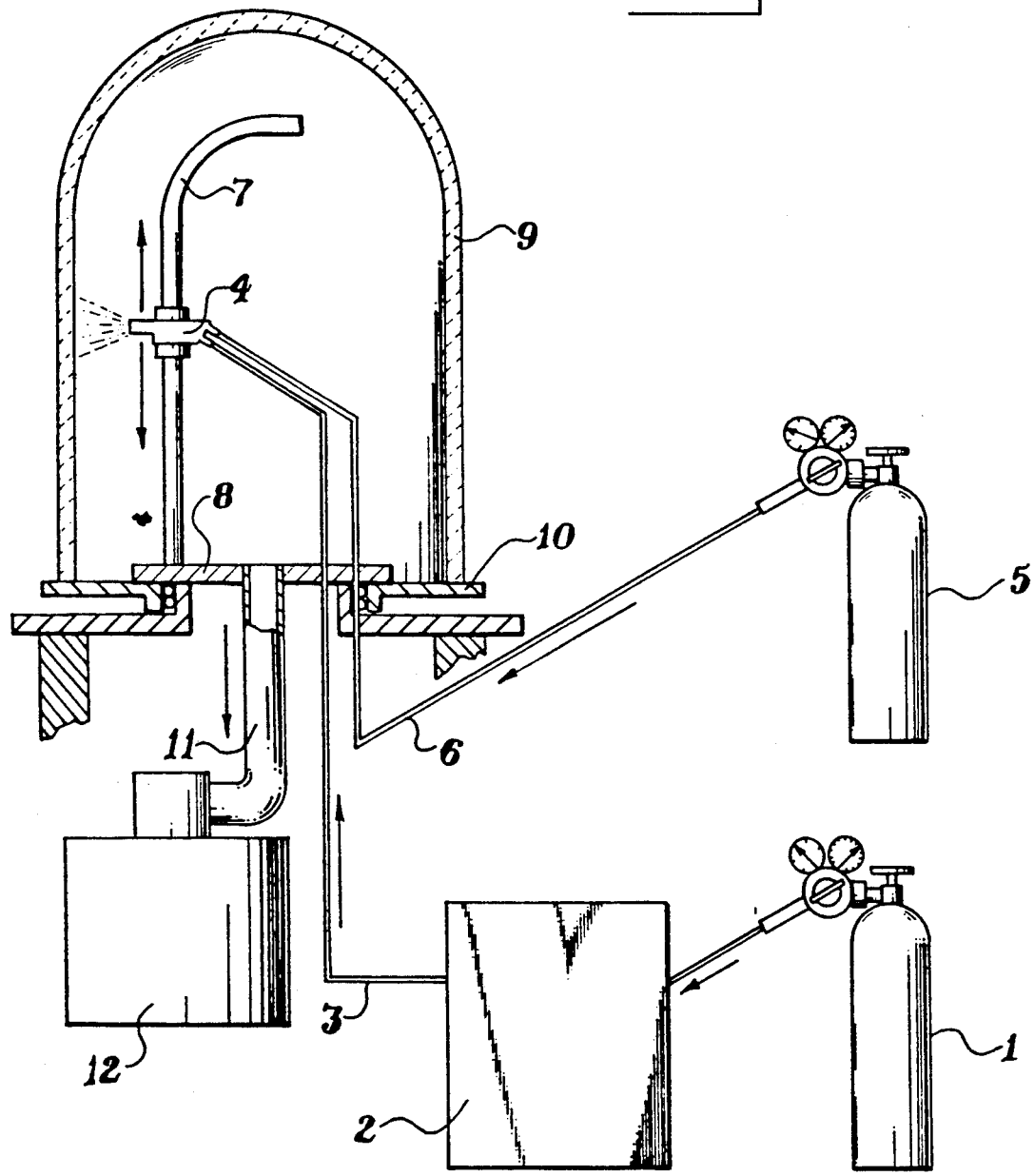
FIG. 1 illustrates a configuration of an apparatus which can be used to practice the process of the present invention.

The present invention is a process for the cleaning of the inner-surfaces of a chemical vapor deposition reactor used in the production of semi-conductor grade polycrystalline silicon. The process comprises impacting the surfaces to be cleaned with solid carbon dioxide pellets. The carbon dioxide pellets dislodge silicon deposits from the surface of the reactor without damaging the surface of the reactor and without providing a source for contamination of semi-conductor grade silicon produced in the cleaned reactor.

DESCRIPTION OF INVENTION

The present invention is a process for cleaning the inner surfaces of a chemical vapor deposition reactor employed in the deposition of silane or chlorosilanes to form semi-conductor grade polycrystalline silicon. The process comprises impacting the inner surfaces to be cleaned with carbon dioxide pellets, to dislodge and allow for removal of silicon deposits which form on the inner surfaces of the reactor.

The present process is particularly useful for cleaning the inner wall of the reaction chamber in which the CVD process is conducted. The reaction chamber may be of conventional design and constructed of any material whose surface or structural integrity is not significantly deteriorated by blasting with carbon dioxide pellets. The reaction chamber may be formed from corrosion resistant metals, for example, high-carbon steels or high nickel steels. The inner surface of the reaction chamber may be clad with an inerting metal such as silver, as described in U.S. Pat. No. 4,173,944, issued Nov. 13, 1979; with a noble metal, semi-noble metal, or high melting point metals such as platinum, tantalum or nickel, as described in U.S. Pat. No. 4,000,335, issued Dec. 28, 1976.

It is preferred that the reaction chamber be of a dual wall design and be fabricated from high-carbon steel. The dual wall design allows the circulation of a cooling liquid, for example a silicone fluid, between the wall of the reactor to cool the inner wall of the reactor and reduce silicon deposits thereon.

Reaction chambers which can be cleaned by the present process includes those in which silane ($SiH_4$) or a halosilane, for example, trichlorosilane, dichlorosilane, monochlorosilane, or monobromosilane have been employed as the feed gas. The decomposition of the silane or halosilane may occur in the presence of other gases, for example, hydrogen.

While the present process is particularly useful for cleaning reaction chambers used in the preparation of semi-conductor grade silicon, those skilled in the art will recognize the process can be used to clean reaction chambers used in the production of other grades of silicon, for example, solar-grade silicon.

FIG. 1 illustrates a configuration of apparatus which can be used to perform the process of the instant invention. The apparatus configuration of FIG. 1 is presented for illustration purposes only and is not meant to limit the scope of the process claimed herein. Any apparatus configuration capable of forming and delivering carbon dioxide pellets with sufficient force to dislodge silicon deposits from a CVD reactor chamber, as described herein, may be used in the process.

Referring to FIG. 1, carbon dioxide gas from cylinder 1 is delivered to pelletizer 2 where the gas is compressed and formed into solid carbon dioxide pellets. The carbon dioxide gas should be of sufficient purity so as not to leave residues during the cleaning process, that could contaminated the product polycrystalline silicon. In practice, food grade carbon dioxide gas has been found to be of sufficient purity to be used in the described process.

A suitable device to function as pelletizer 2 is described, for example, in U.S. Pat. No. 4,389,820, issued Jun. 28, 1983, and this device is incorporated by reference herein. The solid carbon dioxide particles produced by pelletizer 2 can be, for example, of cubicle, cylindrical, or round shape. Preferred is when the particles are in the form of a cylindrical pellet. The pellets must by sufficiently large so as to cause dislodging of the silicon deposits. Preferred are pellets having dimensions within a range of about 1/16 inch to ⅜ inch. It is preferred that the pellets not be greater than about ⅜ inch in their largest dimension, since such large pellets may tend to damage the surface being cleaned. Pelletizer 2 should be selected so as to produce pellets of as high density as reasonably possible, since the density of the pellets is related to the effectiveness of dislodging silicon deposits from the reactor chamber wall. Preferred are carbon dioxide pellets with a density greater than about 85 pounds per cubic foot. More preferred are carbon dioxide pellets with a density greater than about 95 pounds per cubic foot.

Solid carbon dioxide pellets are transferred from pelletizer 2, through conduit 3, to nozzle 4. Preferably conduit 3 should be as short as reasonably possible so that the total time a pellet is in the conduit is minimized. This is important to minimize sublimation of the pellets and assure the pellets will have substantially their initial weight as they impact against the surface to be cleaned. Conduit 3 may be cooled, if desired, to reduce sublimation of pellets. It is preferred that conduit 3 be formed from an elongated flexible tube so as to permit nozzle 4 to be directed as desired. It is preferred, that conduit 3 be made out of a composition such as a reinforced silicone rubber which is not significantly affected by the temperatures of the pellets transferred therein.

The solid carbon dioxide pellets are transferred through conduit 3 by a low pressure gas such as carbon dioxide gas, as previously described. Gas flow through conduit 3 should be sufficient to prevent hang-up or agglomeration of the carbon dioxide pellets in conduit 3.

The solid carbon dioxide pellets are transferred to nozzle 4. Nozzle 4 can be of any conventional design useful for the acceleration and propulsion of carbon dioxide pellets with sufficient speed that upon impact the pellets dislodge silicon deposits from the reactor wall. A useful nozzle is of the type commonly referred to as a "venturi" nozzle. Technically, a venturi nozzle is constructed so as to consist of a short, narrow center section and widened, tapered ends. The ends and the center section in a venturi nozzle are curved slightly. The use of such a nozzle is preferred in order to maximize the velocity at which pellets are emitted from the nozzle. If desired, nozzle 4 can be provided with a conventional cooling jacket. It is preferred that the exit port of nozzle 4 be of a fan shaped design that provides a spray pattern of two to three inches in width when positioned four to six inches from the surface to be cleaned.

Also delivered to nozzle 4 is a high pressure accelerant gas, to increase the velocity of the silicon dioxide pellets exiting nozzle 4. Any gas can be used for this purpose that does not leave a residue that can contaminate the product polycrystalline silicon formed in the cleaned reactor. A preferred gas is nitrogen. In FIG. 1, nitrogen gas is delivered from pressurized cylinder 5, through conduit 6, to nozzle 4. Conduit 6 can be formed from materials as described for conduit 3. The accelerant gas can be provided to nozzle 4 at a pressure of about 40 to 250 psi. When lower pressures are used the momentum of a pellet hitting against a surface will normally be too small to dislodge the silicon deposits. Higher gas pressures may be used but the process may be impeded by the usual problems encountered in conveying relatively high pressure fluids. A preferred pressure range for the accelerant gas is about 175 to 200 psi.

The relative quantities of pellets and of accelerant gas which can be used together can be varied between wide limits and is not considered critical to the present process. In general, the rate at which pellets move through nozzle 4 should be correlated with the volume of accelerant gas through the nozzle so that the gas stream is not overloaded with pellets to the extent that there is danger of the pellets not being entrained within and not moving with the stream of accelerant gas.

Nozzle 4 is mounted on conveyor arm 7, which allows movement of nozzle 4 in relation to the surface to be cleaned. Conveyer arm 7 is supported on fixed base 8 by standard means such as welding or bolts. Conveyor arm 7 can be of conventional designs incorporating a movable chain, belt, or screw for moving the nozzle along the length of the conveyor arm.

The carbon dioxide pellets are ejected from nozzle 4 toward the inner surface of reaction chamber 9, so as to impact against the surface and dislodge deposited silicon. Reaction chamber 9 is positioned on rotatable platform 10, which allows rotation of the reaction chamber around nozzle 4. Therefore, by coordinating the speed of nozzle 4 along conveyor arm 7 and the speed of rotatable platform 10, it is possible to clean the entire inner surface of the chamber in a single automated process. Speed control of nozzle 4 and rotatable platform 9 can be accomplished by standard means using microprocessors, limit switches, and variable speed motors controlled thereby (not shown in FIG. 1).

Fixed base 8 contains an opening through which vacuum conduit 11 is passed. Vacuum conduit 11 is connected to vacuum 12. Vacuum 12 can be any standard vacuum apparatus appropriate for collection of silicon dust and particles as they are dislodged from the wall of reaction chamber 9.

The following example is offered as evidence of the results that can be obtained using pellets of carbon dioxide to clean silicon deposits from the wall of a CVD reactor. The example is provided for illustration only and is not meant to limit the present claims.

Example. The utility of using carbon dioxide pellets to blast clean the inner surface of a CVD reactor, used for the deposition of polycrystalline silicon, was evaluated. The reactor was a standard high-carbon steel reactor in which trichlorosilane had been deposited, in the presence of hydrogen gas, onto a heated silicon element.

Runs 622 to 631 are included for reference purposes only and are not within the scope of the present invention. Prior to run 622, the inner surface of the CVD reaction chamber was cleaned by blasting with high pressure water at about 6000 psi and then blasting with nitrogen at about 300 psi. For subsequent runs number 623 through 631, the inner surface of the chamber was cleaned by blasting with high pressure nitrogen between each run. This data demonstrates the typical decrease in time of subsequent runs, when the inner surface of the reaction chamber is cleaned by blasting with nitrogen gas at about 300 psi between each run.

By comparison, runs 632 through 637 demonstrate the results obtained when the inner surface of the reaction chamber is blasted with carbon dioxide pellets between each run. The carbon dioxide blasting of the CVD reaction chamber wall was performed using an apparatus configuration similar to that illustrated in FIG. 1. The source of carbon dioxide pellets was a Cleanblast (tm) apparatus manufactured by Alpheus Cleaning Technologies, Rancho Cucamonga, Calif. The carbon dioxide pellets were about 1/16 inch in their largest diameter. Nitrogen gas at a pressure of about 180 to 250 psi was used to accelerate the carbon dioxide pellets from a venturi design nozzle. The nozzle was maintained at a distance of about 3 to 5 inches from the surface to be cleaned. The reaction chamber was rotated at a speed of about one revolution per minute around the nozzle. The nozzle traveled along the conveyer arm at a speed of about two to three inches per minute.

The quality of the cleaned surfaces was assessed by visual inspection and by the length of time the reactor could be run at a desired element temperature before temperature buildup within the reactor required reduction of power, to maintain product polycrystalline silicon quality. The results are presented in Table 1.

TABLE 1

Effects of Cleaning Technique on Reactor Run Time at Full Power

| Nitrogen Gas Blasting | | $CO_2$ Pellet Blasting | |
|---|---|---|---|
| Run No. | Run Length(h) | Run No. | Run Length(h) |
| 622 | 31 | 632 | 29 |
| 623 | 27 | 633 | 27.5 |
| 624 | 25 | 634 | 28.5 |
| 625 | 25.5 | 635 | 28.5 |
| 626 | 24.5 | 636 | 28.6 |
| 627 | 23.7 | 637 | 27.5 |
| 628 | 24 | | |
| 629 | 22 | | |
| 630 | 21.8 | | |
| 631 | 21 | | |

The data presented in Table 1 demonstrate that when the inner surface of the reaction chamber is cleaned with nitrogen gas blasting, there is a progressive shortening of the time the power to the deposition elements can be maintained at optimal conditions. When the inner surface of the reaction chamber is cleaned by blasting with carbon dioxide pellets, there is no similar shortening of the run time.

The polycrystalline silicon rods prepared by the above processes were analyzed for the presence of trace contamination by carbon, phosphorous, boron, and iron. The results of these analysis are presented in Table 2. Carbon contamination of the polycrystalline silicon was analyzed for by Fourier transform infrared spectroscopy, boron and iron by atomic absorption, and phosphorous by photoluminescence. The results are reported as parts per billion (ppb) of contaminate in the polycrystalline silicon.

TABLE 2

Effect of Cleaning Reaction Vessel With Carbon Dioxide Pellets on Trace Contaminates in Polycrystalline Silicon

| | Contaminate Conc. (ppb) | | | |
|---|---|---|---|---|
| Run No. | Carbon | Phosphorous | Boron | Iron |
| (Nitrogen Gas Blasting) | | | | |
| 627 | 0.07 | 0.110 | 0.008 | 1.30 |
| 628 | 0.09 | 0.120 | 0.014 | 1.50 |
| 629 | 0.09 | 0.073 | 0.006 | 3.60 |
| 630 | 0.09 | 0.093 | 0.008 | 1.30 |
| 631 | 0.06 | 0.074 | 0.010 | 0.67 |
| Mean | 0.08 | 0.094 | 0.009 | 1.67 |
| ($CO_2$ Pellet Blasting) | | | | |
| 633 | 0.06 | 0.092 | 0.012 | 2.16 |
| 634 | 0.08 | 0.099 | 0.007 | 0.54 |
| 635 | 0.10 | 0.102 | 0.011 | 2.93 |
| 636 | 0.07 | 0.107 | 0.014 | 0.50 |
| Mean | 0.08 | 0.100 | 0.011 | 1.53 |

The results presented in Table 2 indicate that cleaning of the reactor walls with carbon dioxide pellets does not significantly increase the level of the contaminates assayed.

What is claimed is:

1. A process for cleaning the surfaces of a chemical vapor deposition reactor, the process comprising: impacting silicon deposits on the inner surfaces of a reactor used in chemical vapor deposition of a source gas selected from a group consisting of silane and halosilane to form polycrystalline silicon, with carbon dioxide pellets to effect dislodgment of the silicon deposits.

2. A process according to claim 1, where the polycrystalline silicon is of semi-conductor grade.

3. A process according to claim 1, where the source gas is trichlorosilane.

4. A process according to claim 1, where the carbon dioxide pellets have dimensions within a range of about 1/16 inch to about ⅜ inch.

5. A process according to claim 1, where density of the carbon dioxide pellets is greater than about 85 pounds per cubic foot.

6. A process according to claim 1, where density of the carbon dioxide pellets is greater than about 95 pounds per cubic foot.

7. A process according to claim 1, where an accelerant gas is used to increase velocity of the carbon dioxide pellets, the accelerant gas is nitrogen gas, and pressure of the nitrogen gas is about 40 to 250 psi.

8. A process according to claim 7, where the pressure of the nitrogen gas is about 175 to 200 psi.

9. A process according to claim 1, where the inner surfaces of the reactor is constructed from high carbon steel.

10. A process according to claim 1, where the reactor surfaces to be cleaned are rotated around a moveable nozzle for delivering the carbon dioxide pellets.

* * * * *